United States Patent
Reid

(10) Patent No.: US 6,860,435 B2
(45) Date of Patent: Mar. 1, 2005

(54) IRRIGATOR

(76) Inventor: Stuart Dundonald Reid, 266 Normandale Rd., Lower Hutt (NZ), 6009

(*) Notice: Subject to any disclaimer, the term of this patent is extended or adjusted under 35 U.S.C. 154(b) by 279 days.

(21) Appl. No.: 10/164,985

(22) Filed: Jun. 7, 2002

(65) Prior Publication Data

US 2003/0006323 A1 Jan. 9, 2003

(30) Foreign Application Priority Data

Jun. 8, 2001 (NZ) ................................. 512271

(51) Int. Cl.[7] ................................. B05B 1/20
(52) U.S. Cl. ................................. 239/159
(58) Field of Search ................. 239/159, 195–198, 239/251, 255, 225.1, 722–723, 745–749

(56) References Cited

U.S. PATENT DOCUMENTS 4,067,497 A * 1/1978 Cornelius .................. 239/728
5,236,131 A * 8/1993 Hayward .................. 239/745

FOREIGN PATENT DOCUMENTS

| NZ | 272444 | 3/1998 |
| US | 2002/0030128 | 3/2002 |

* cited by examiner

Primary Examiner—David A. Scherbel
Assistant Examiner—Thach h. Bui
(74) Attorney, Agent, or Firm—David C. Jenkins; Eckert Seamans Cherin & Mellott, LLC

(57) ABSTRACT

An irrigator for distributing a constant depth of fluid as the irrigator moves over an area. The irrigator has a moveable nozzle boom arm, a winch with cable and a governor. The governor is connected to the moveable nozzle boom arm and to the winch. In use the governor controls the speed of winch and the speed and movement of the moveable nozzle boom arm, so that application depth of liquid being applied by the irrigator can be kept substantially constant.

15 Claims, 6 Drawing Sheets

IRRIGATOR

FIELD OF INVENTION

This invention relates to irrigation apparatus and equipment for agricultural purposes (hereinafter "irrigator") and more particularly relates to travelling irrigators intended for the spray distribution of water and/or liquid/liquefied manure and fertilising liquids over large areas of land. In particular it describes a governor for regulating the irrigator's speed in spite of the variations of force to which the irrigator is subjected as it traverses the terrain and it also describes a means of preventing the irrigator winding cable from being subjected to over-tension.

BACKGROUND OF INVENTION

Generally known effluent distributing travelling irrigators typically used in New Zealand for the disposal and use as a fertiliser of dairy manure, are coupled to a hydrant in a paddock by means of a long flexible pipe around 200 meters long and 65 mm in diameter. The irrigator has a nozzle boom arm which rotates or oscillates in operation under the force of a jet emitted from the nozzle or nozzles, and as it rotates or oscillates it drives a winch. A cable is attached to this winch and the other end to a solid anchor and as the nozzle arm rotates or oscillates, the winch winds up the cable so that the irrigator pulls itself (and the flexible hose to which it is connected) along the paddock distributing the effluent liquid fertiliser or water etc. In most cases the motion of rotation or oscillation of the nozzle boom arm is transferred to the winch drum by way of mechanical linkages such as cranks or cams and pushrods operating in conjunction with clutches commonly featuring ratchet mechanisms and in some cases the motion is transferred from the rotating nozzle arm to the winch drum by means of a gearbox and chain or belt drive.

It is important that the irrigator speed is controlled so that the application depth of the sprayed liquid is approximately constant over the paddock and this is usually achieved by adjusting the angles by which the jet or jets leave the nozzles relative to the nozzle boom arm assembly. However, as the irrigator travels it will encounter changing gradients and hose drag and perhaps other retarding forces so that the original nozzle boom arm rotational or oscillating speed and torque may no longer be adequate to maintain the desired speed of the irrigator. When this happens the irrigator travel speed will slow down and will not regain its set speed until the retarding forces are again equal to those at which the irrigator travel speed was originally set. In this way the application depth of the liquid issuing from the nozzles will vary according to the varying irrigator travel speed. The present mechanical linkages and/or belt/chain transmissions do not incorporate speed regulation. A further difficulty occurs when the retarding force approaches or exceeds the tensile strength of the cable. In such cases the nozzle boom arm may be able to apply sufficient torque to the winch drum to tension the pulling cable excessively or even to breaking point.

OBJECTS OF INVENTION

It is one object of the present invention to provide a form of speed control or regulation (often called "governing") that maintains almost constant set speed of the irrigator within a tolerance band irrespective of the varying accelerating or retarding forces caused by the changing pulling loads or the gravitation effects felt when the irrigator is working on undulating hill country.

A further object of the invention is to regulate speed of the irrigator to give substantially constant liquid application depth, irrespective of liquid supply pressure, changing loads or gradients.

Another object of the invention is to provide a means of limiting the winch cable tension to a safe and predetermined limit.

It is a further object of the invention to provide a means of transferring the torque and energy of motion of the irrigator nozzle boom arm to the winch or winding apparatus other than by mechanical means such as rods or belt and chain drives and which allows flexibility in the relative dispositions of the components of the irrigator.

It is yet another object of the invention to provide an irrigator in which the irrigator speed is controlled so that the application depth of the sprayed liquid is approximately constant over the paddock being irrigated.

It is another further object to at least provide the public with a useful choice.

SUMMARY OF INVENTION

According to one aspect of the invention there is provided an irrigator comprising a moveable nozzle boom arm adapted to drive a winding means, the driving of the winding means being controlled by a governor connected to the moveable nozzle boom arm and the winding means, and wherein, in use, the governor controls the speed of the winding means and the speed and movement of the moveable nozzle boom arm.

In a preferred aspect of the invention the governor further comprises regulation means adapted to regulate the speed of the winding means and the speed and of the nozzle boom arm.

In a further preferred aspect of the invention the regulation means maintains or regulates the speed of the winding means and the speed of the nozzle boom arm at substantially a constant tolerance or within an acceptable tolerance so that as varying forces are applied to the irrigator the speed of travel and application depths of the liquid are not significantly altered from the selected speed.

In a further preferred aspect of the invention the governor comprises a limiting means that limits the torque applied to the winding means so that an upper tension limit on the cable or rope is not exceeded.

In a further preferred aspect of the invention the governor is part of a hydraulic transmission means which preferably comprises at least one hydraulic valve, at least one hydraulic cylinder, at least one spring, at least one linkage and at least one clutch arranged and connected together so as to control the speed of the winding means and the speed and movement of the moveable nozzle boom arm.

In a further preferred aspect of the invention the speed of the winding means and the speed of the nozzle boom arm are regulated at a substantially constant rate.

In a further preferred aspect of the invention the regulation means comprises pressure and temperature compensated hydraulic flow valves.

In a further preferred aspect of the invention the regulation means has an electronically motorised control valve system to control the impact of changing environmental and physical conditions when operating the irrigator.

According to a second aspect of the invention there is provided a travelling irrigator comprising at least a winding means whose winding action is derived from an hydraulic transmission means connecting a shaft of the winding means to a rotating or oscillating nozzle boom arm, the hydraulic transmission means having a regulation means to regulate the speed of the winding means and nozzle boom arm and to maintain the speed substantially constant or within an acceptable tolerance so that as varying forces are applied to the travelling irrigator the speed is not significantly altered.

In a preferred second aspect of the invention the hydraulic transmission means comprises a limiting means to limit the torque applied to the winding means so that an upper limit to the tension in a cable, which draws the irrigator along the paddock, is not exceeded.

In a further preferred second aspect of the invention the hydraulic means allows the speed of the irrigator winch and nozzle boom arm to be regulated at a substantially constant rate and where the regulator means incorporate pressure and temperature compensated hydraulic flow valve arrangements.

In a further preferred second aspect of the invention the regulator means are electronically motorised control valve systems. Such systems can lessen the impact of changing environmental and physical considerations such as temperature fluctuations, when operating the irrigator, and can take account of variations in liquid supply pressure, which may alter as the irrigator climbs or descends in a field or paddock.

In a preferred aspect of the invention the winding means can be a winch or a winding drum such as a capstan.

In a third aspect of the invention there is provided a method of moving an irrigator comprising transferring the movement of an irrigators nozzle boom arm, via a governor, to a winding means on the irrigator so that as the nozzle arm boom moves in a transverse direction when irrigating, the speed of the nozzle arm boom and the speed of the winding means is regulated by the governor enabling the winding means to wind up a cable, which is attached at one end to a solid anchor, to the pull the irrigator along at a regulated speed.

A preferred third aspect of the invention involves the method of moving an irrigator where as the cable is being wound the torque applied thereto does not exceed an upper tension limit.

In a fourth aspect of the invention there is provided a governor connected to a nozzle boom arm and to a winding means of an irrigator, wherein the governor comprises a regulation means and limiting means, the regulation means being adapted to regulate the speed of the winding means and the speed of the nozzle boom arm and the limiting means being adapted to limit the torque applied to the winding means so that an upper tension limit in a cable, which draws the travelling irrigator, is not exceeded.

Other aspects of the invention are described herein.

BRIEF DESCRIPTION OF THE DRAWINGS

The invention will now be described by way of example with reference to the accompanying drawings in which.

DESCRIPTION OF INVENTION

Figure 1:
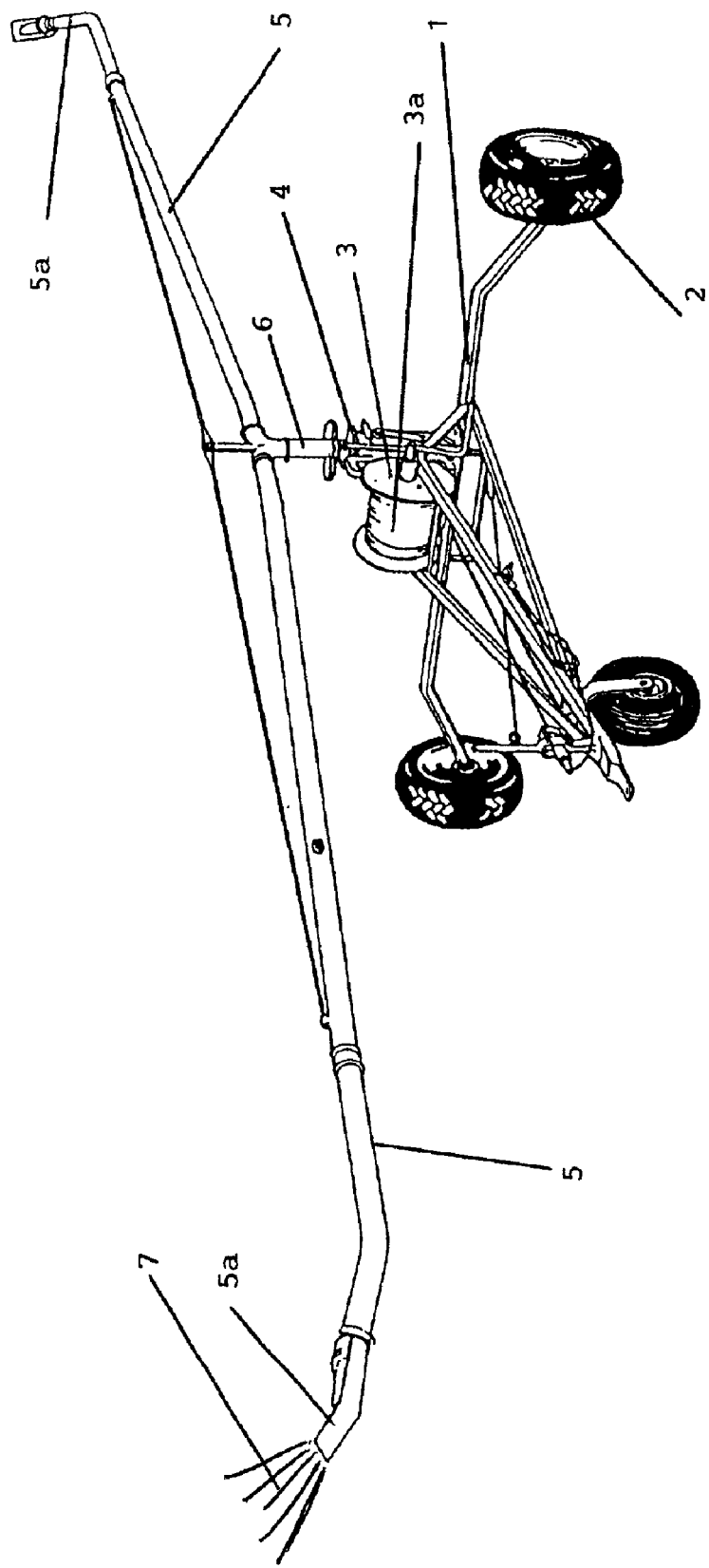
FIG. 1 illustrates one example of a known travelling irrigator with a fully rotational nozzle boom arm and mechanical linkage type transmission between the nozzle boom arm and the winch drum.

Referring firstly to the known irrigator of FIG. 1, this is a typical example of travelling irrigators in common use in New Zealand and elsewhere for the spraying disposal/distribution of liquid dairy waste, liquid manure or fertiliser and or simple water irrigation and includes a support frame 1 having a number of ground wheels 2 and a cable 3a and winch drum assembly 3 which is driven by a mechanically connected transmission means 4 operated on rotational movement of the nozzle boom arm 5 about its central vertical axis and rotary gland 6 to which the effluent or other liquid supply hose (not shown) is coupled; opposite outer ends of the spray boom or arm 5 having angled spray nozzles 5a by which the liquid sprayed 7 under pressure causes the nozzle boom arm 5 rotation.

Figure 2:
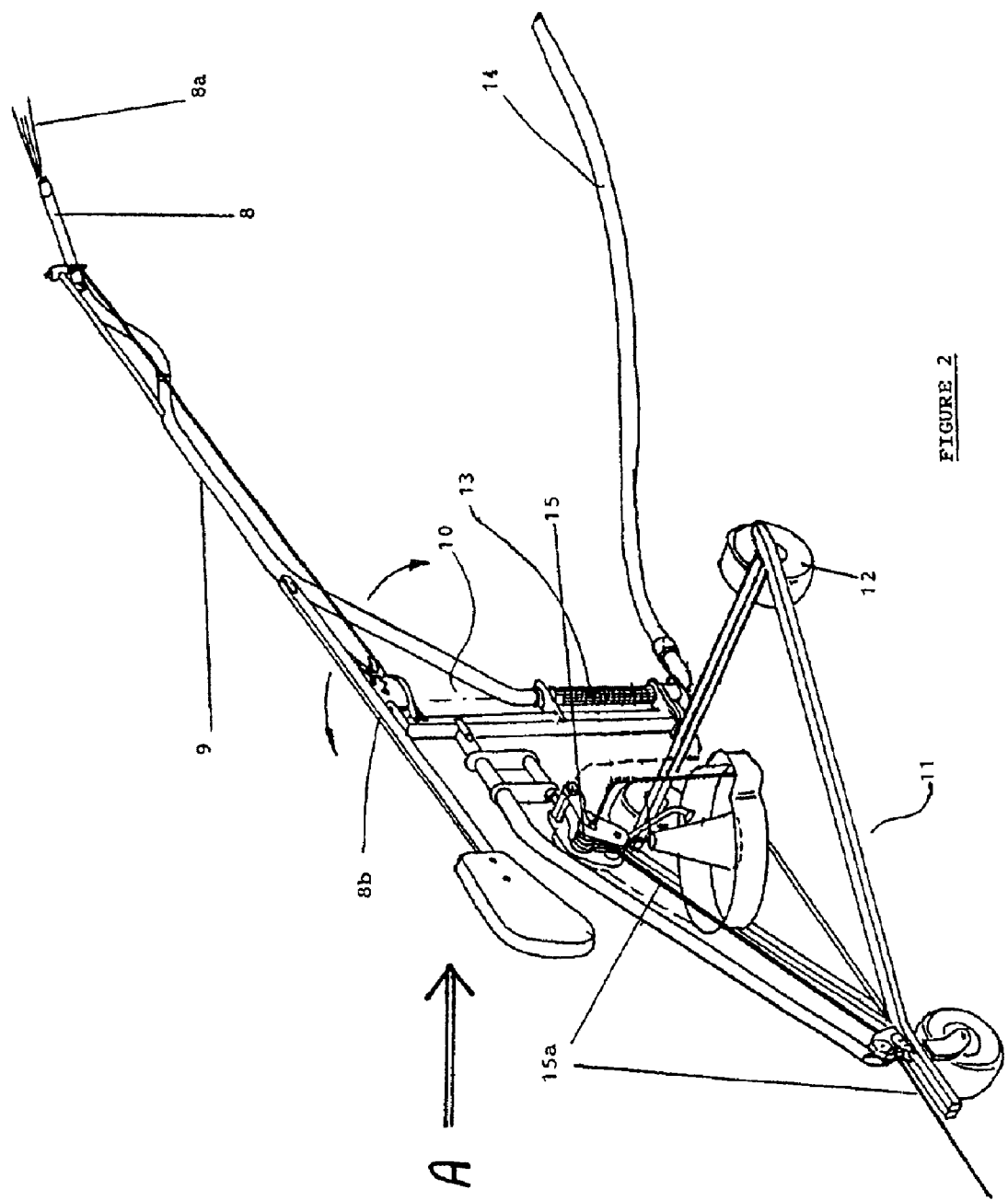
FIG. 2 illustrates an example of a travelling irrigator with a single oscillating nozzle boom arm where the liquid is sprayed over an arc of around 180 degrees behind the irrigator and which incorporates a hydraulic transmission of the energy of the moving nozzle boom arm and the irrigator's cable winding means. The hydraulic transmission means has been omitted from this illustration for clarity but it is shown in the following FIG. 3.

Referring now to FIG. 2 which is an example of an irrigator A with one nozzle 8 at the end of a nozzle boom arm 9 (from which a jet 8a issues) which rotates about its central vertical axis 10 first the one way through less than one full turn until the nozzle 8 is switched by a mechanism 8b so that it effects the rotation of the nozzle boom arm 9 in the reverse rotational direction for less than one turn until the nozzle 8 is again switched to its original position. This irrigator A also has a support frame 11; a number of ground wheels 12 and a rotary gland or twisting hose connector arrangement 13 which allows rotational movement between the nozzle boom arm 9 and the connected supply hose 14. The winding mechanism 15 which winds in the cable 15a is connected by a governor B (not shown in this figure but which is shown in FIG. 3) to the rotational action of the nozzle boom arm 9.

Figure 3:
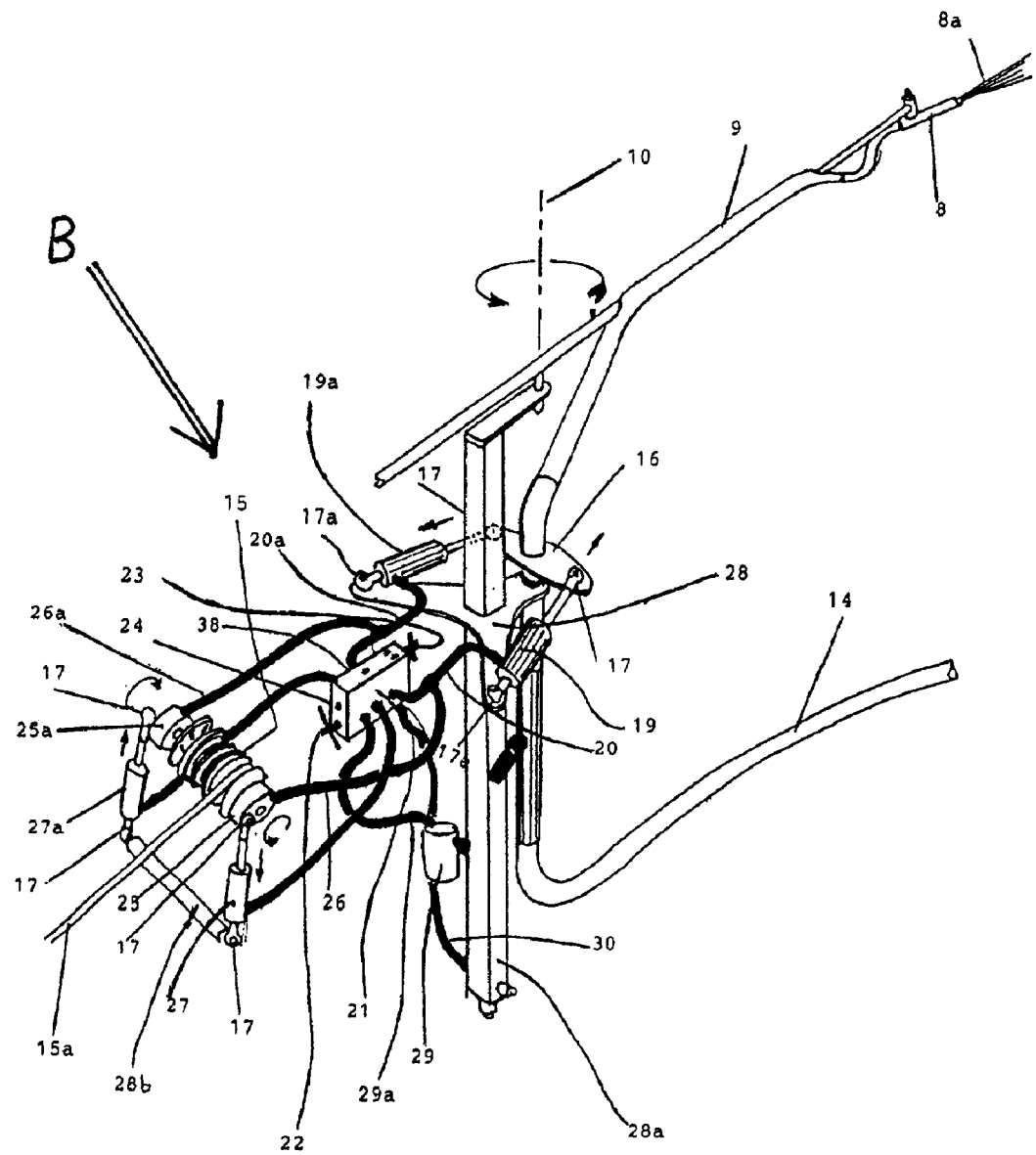
FIG. 3 is a view of a group of hydraulic components which make up the transmission means of the irrigator in FIG. 2 but with some components of the irrigator deleted for clarity.

Referring now to FIG. 3, the hydraulic components of the governor B (which transfers the rotational energy from the oscillating nozzle boom arm 9 to the winding drum 15) are shown, with a yoke 16 attached to the nozzle boom arm at a point where the nozzle boom arm's motion is about the central vertical axis 10 and to this yoke by way of flexible joints 17 are attached two hydraulic cylinders 19 and 19a which function as pumps providing a source of pressurised liquid when then nozzle boom arm is rotating. The other ends of the hydraulic cylinders 17a are attached to the frame 28 of the irrigator A. The hydraulic cylinders 19 and 19a are then connected by a conduit 20 and 20a (such as a flexible hydraulic hose) to a valve manifold block 21. This valve manifold block 21 contains a pressure and temperature compensated adjustable flow control valve where the adjustment is made at control wheel 22, a by-pass valve 23; a directional valve 38 which selects the direction either in or out in which the two hydraulic cylinders 27 and 27a should move and a pressure relief valve 24 which is preferably set in the factory prior to the sale of the irrigator A. However these valves and/or various combinations of them may also be separate entities connected by hoses or other conduits. (The functions of the valves in the manifold block are described with reference to FIGS. 4 and 5, later.) The collection of hydraulic valves housed in the manifold block 21 is further connected to two hydraulic clutches 25 and 25a by conduits 26 and 26a and also to two hydraulic cylinders 27 and 27a, The hydraulic cylinders 27 and 27a are physically attached by way of flexible joints of the type 17 to the clutches 25 and 25a respectively and function along with the action of the clutches as actuators to bring about the rotation of the winch or winding drum. The clutches 25 and 25a are mounted on the winding drum shaft 8 and hydraulic pressure via the conduits 26 and 26a actuates the clutches 25 and 25a so that they grip the winding drum shaft alternately or they allow the shaft to rotate freely when the hydraulic pressure is removed. The opposite ends of the hydraulic cylinders 27 and 27a are attached to part of the frame 28b of the irrigator A and take the thrust or pull of the hydraulic cylinders 27 and 27a. In this particular version of the invention the frame of the irrigator A forms a reservoir 28a which contains the hydraulic fluid, usually a form of mineral oil, and oil contained therein is supplied to the valve manifold block 21 via a filter 29 and conduit 29a. A final conduit 30 allows oil to return from the valve manifold block to the reservoir 28a. Hydraulic cylinders 27 and 27a may be fitted with external or internal springs 30 and 30a so that when the cylinders ports are connected to the reservoir the springs retract the piston of the hydraulic cylinder and transfer the oil contained in the cylinder back to the reservoir 28a.

Figure 4:
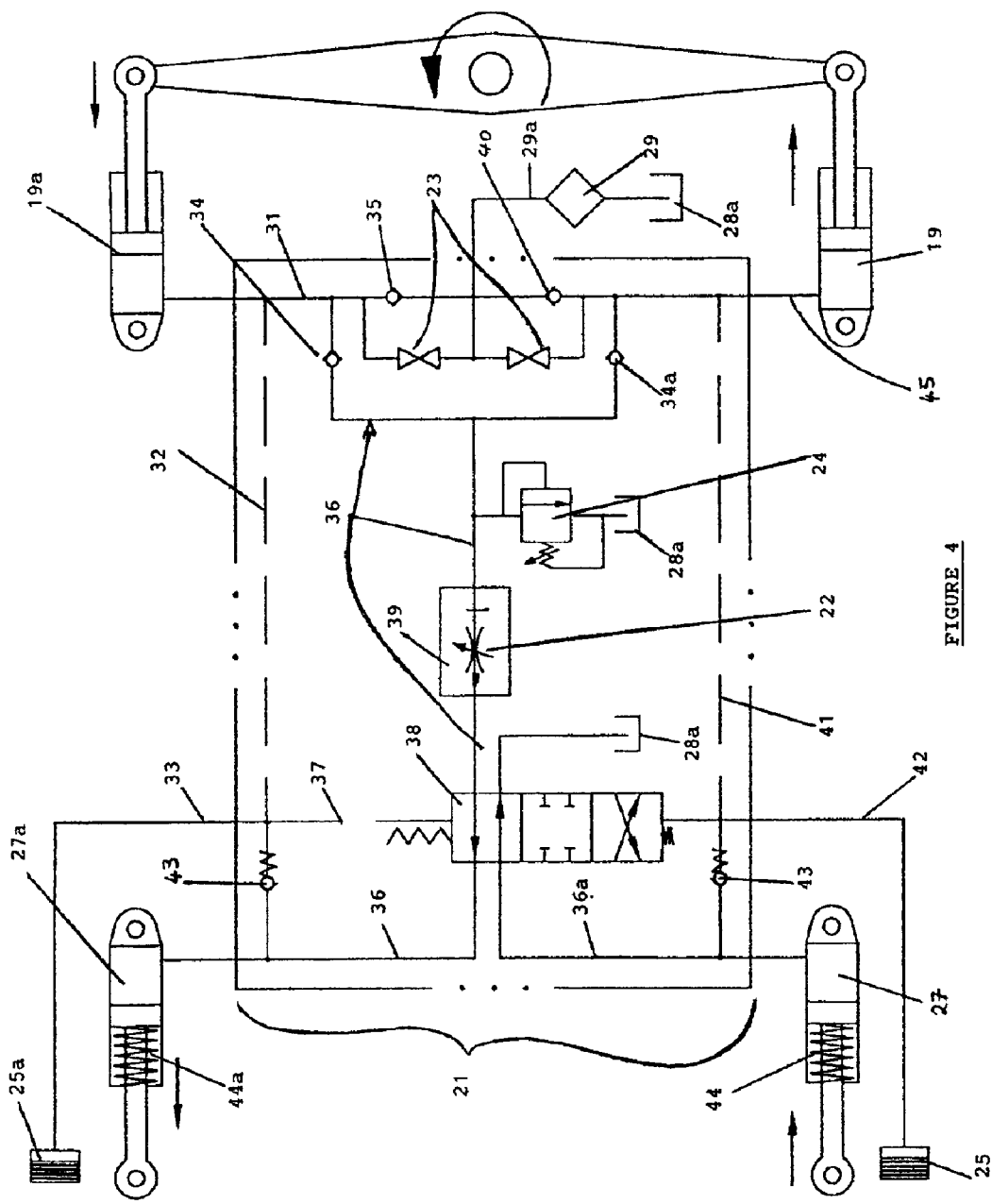
FIG. 4 is a schematic diagram of the hydraulic transmission shown in FIG. 3 using symbols commonly used in the hydraulic industry to represent the various hydraulic components of the transmission system of the irrigator in FIG. 2. This illustration depicts the nozzle boom arm as it begins its rotation in the clockwise direction as shown by the arrow surrounding the vertical axis of the nozzle boom arm.
Figure 5:
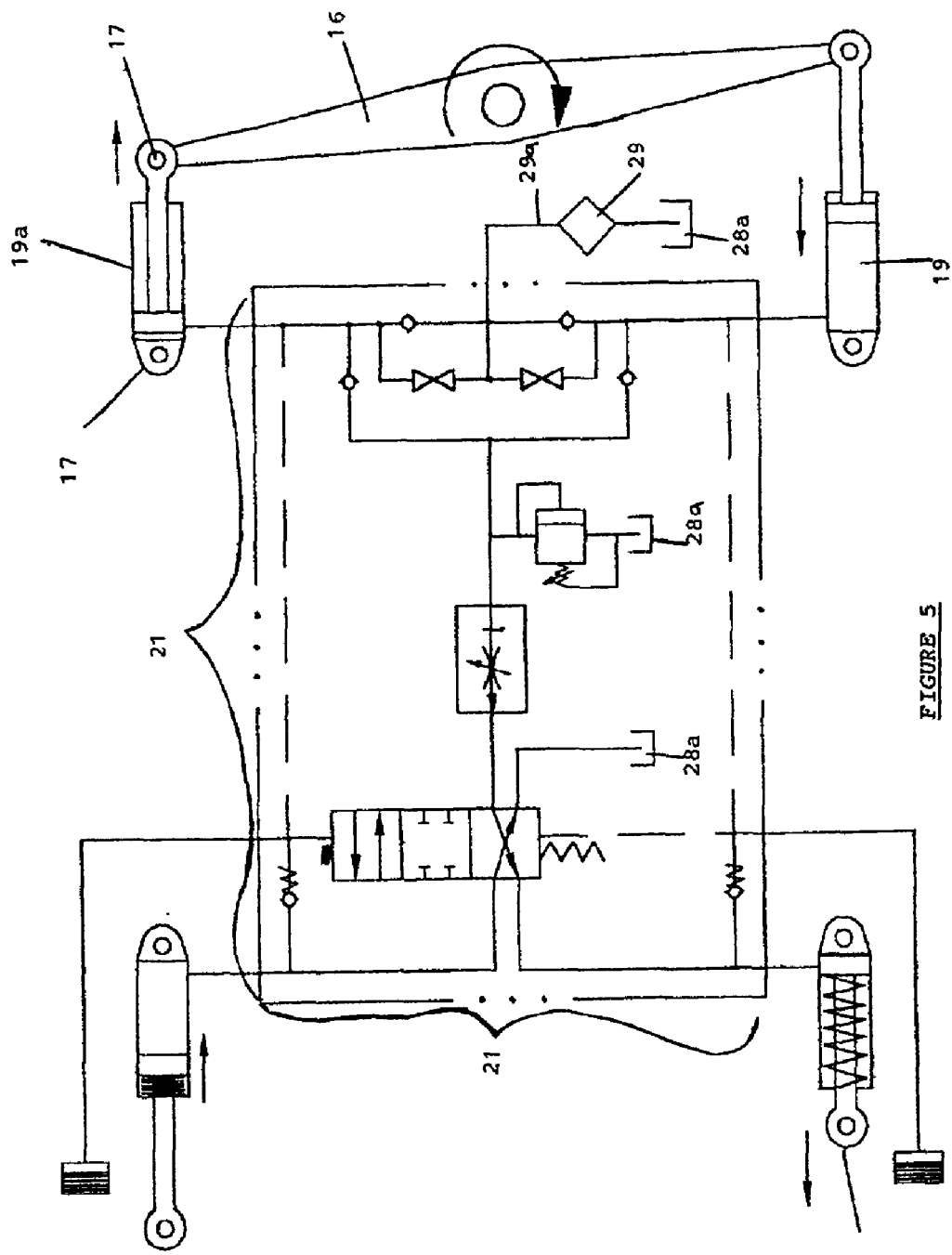
FIG. 5 is a schematic diagram of the hydraulic transmission. This illustration depicts the nozzle boom arm as it begins its rotation in the anti-clockwise direction as shown by the arrow surrounding the vertical axis of the nozzle boom arm.

Referring now to FIGS. 3 and 4, the operating sequence of the irrigator A will be described. The yoke 16, which is attached to the nozzle boom arm 9 is rotating under the action of the force of the jet 8a issuing from the nozzle 8, forces the piston of hydraulic cylinder 19a into the cylinder pressurising the oil therein. Thus oil flows along paths 31, 32, 33, 36 and 37. Oil flows freely through the non-return valve 34 but is prevented from passing through the non-return valve 35 and the closed by-pass valve 23. The pressurised oil in line 33 causes the clutch 25a to lock and thus grip the winding drum shaft; the pressurised oil in line 37 holds the directional valve 38 open in the position as shown and oil passes along pathway 36 at a preselected and controlled flow rate by way of the pressure and temperature compensated flow valve 39 and through the ports of the directional valve 38 to hydraulic cylinder 27a. This cylinder is attached to the locked clutch 25a and in extending transfers its motion to the clutch 25a which rotates the winding drum and reels or winds in 5 the cable. Meanwhile, at the other end of the yoke 16, cylinder 19 is being extended and creates a vacuum in lines 41, 42 and 45. The vacuum is not sufficient to allow the biased non-return valve 43 to pass oil. The vacuum in lines 41, 42 and 45 allows the pressure in clutch 25 to fall and so it is not locked to the winding drum shaft. The directional valve 38 will allow the hydraulic cylinder 27 to return its charge of oil to the reservoir 28a via path 36a and under the action of the internal spring 44, so that it retracts ready for the next cycle and the vacuum in line 39 allows the pump cylinder 19 to draw a fresh charge of oil into the cylinder via non-return valve 40 and line 29a from the reservoir. FIG. 5 is a schematic representation of the state of the irrigator A when the nozzle boom arm 9 and yoke 16 have reached the limit of the clockwise direction shown previously in FIG. 4 and the nozzle 8 and jet 8a have now switched so as to reverse the direction of travel of the nozzle boom arm 9 and yoke 16. Pressure has just begun to be developed in pump hydraulic cylinder 19 and this has locked clutch 25 and shifted valve 38 so that hydraulic cylinder 27 may now extend and rotate the winch drum shaft via clutch 25, The symmetry of the hydraulic circuit means the process described above referring to FIG. 4 is repeated. This process allows for hydraulic cylinders 27 and 27a with respective internal springs 44 and 44a, to alternately rotate the winding drum via clutches 25 and 25a, which alternately engage or disengage respectively as required.

If the hydraulic pressure generated in line 36 by the hydraulic pumps 19 and 19a exceeds a preset limit the relief valve 24 will open so as to prevent excessive pressure being developed which would cause cylinders 27 and 27a to exert too much force on the clutches 25 and 25a and thus too much tension in the irrigator cable 15a.

The by-pass valves 23 can be opened by the operator to vent residual pressure in the hydraulic circuit so that the clutches will disengage from the winding drum shaft and the cable 15 can be pulled out from the winding drum with minimum resistance. The valve 38 would be fitted with a spring arrangement which prevents it from switching unless a certain pre-determined pressure had built up in lines 31, 32, 33, 36 and 37 when the irrigator A was operating as shown in FIG. 4. It is the intention of this feature to ensure that one clutch does not "let go" of the winding drum shaft before the other clutch has engaged.

Figure 6:
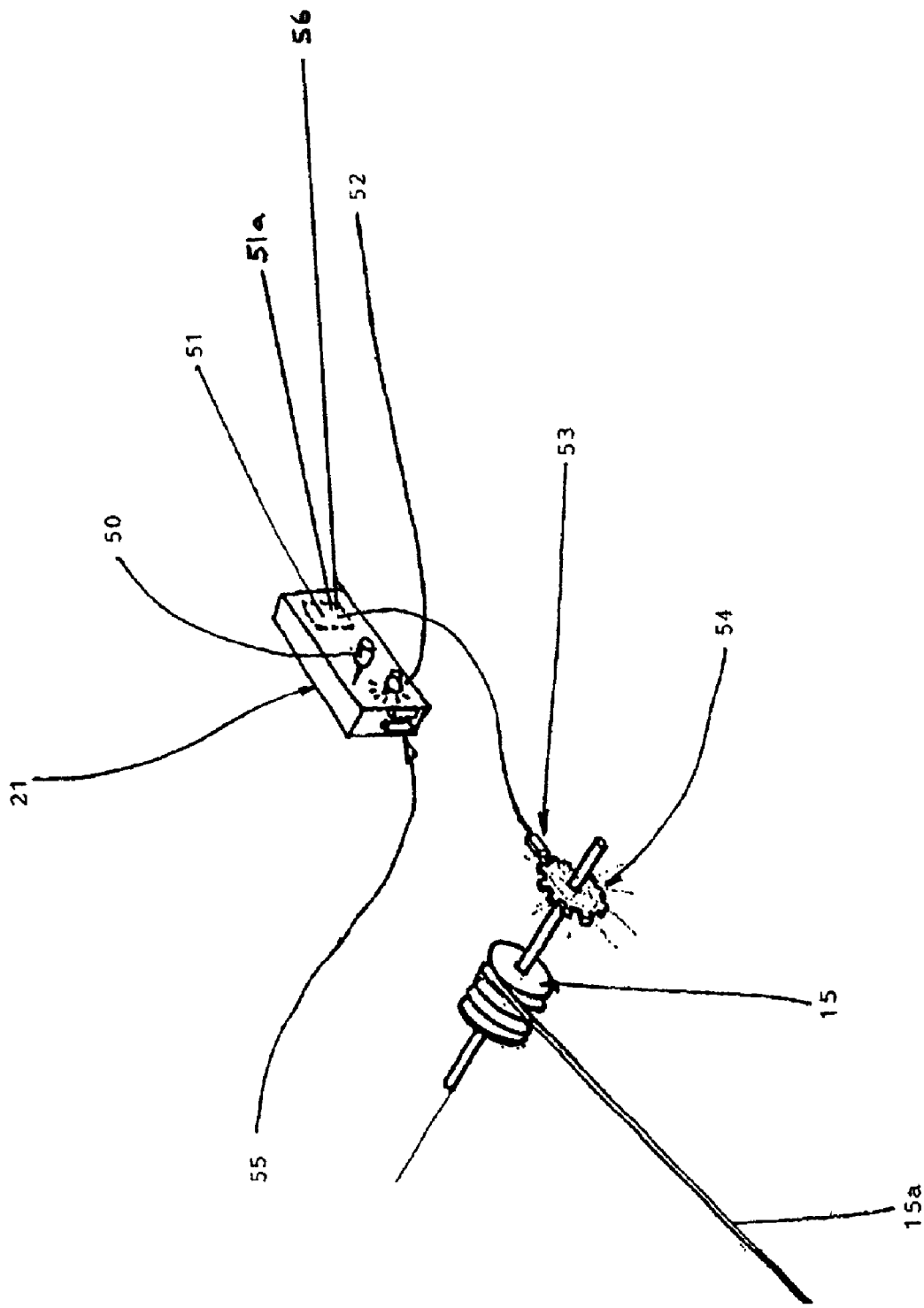
FIG. 6 illustrates a preferred arrangement wherein the flow compensated hydraulic system housed in or around the valve manifold block 21 is replaced by an electronic flow control arrangement 21 a. Such an arrangement comprises a motorised flow control valve 51, an electronic circuit or circuit board 51a, a selector 52 to select the desired liquid application depth, a sensor 53, a toothed wheel 54, an irrigator winding drum 15, a cable 15a and batteries for power source 55. A selector 50 which indicates the nozzle diameter in use.

Referring now to FIG. 6 the flow compensated hydraulic system housed in or around the valve manifold block 21 is replaced by an electronic flow control arrangement 21a. The electronic flow control arrangement 21a comprises a motorised flow control valve 51, an electronic circuit or circuit board 51a, a selector 52 to select the desired liquid application depth, a sensor 53, a toothed wheel 54, an irrigator winding drum 15, a cable 15a and batteries for power source 55. A nozzle diameter selector indicates the diameter of nozzle in use. A pressure sensor 56 measures the irrigator liquid supply pressure.

Other arrangements of the valves are possible to achieve similar ends but it is the provision of load compensated flow control for the regulation of irrigator speed; over pressure relief to restrict cable tension to safe limits and the flexibility of the transmission type which allows for the free placement of the winding components with respect to the nozzle boom arm unlimited by the constraints of pushrods, belt and chain transmission, and cams, which are the objects of this invention.

Where in the foregoing description reference has been made to integers or components known equivalents, then such equivalents are deemed to be incorporated herein as if individually set forth.

It is to be understood that the scope of the invention is not limited to the described embodiments and therefore that numerous variations and modifications may be made to these embodiments without departing from the scope of the invention as set out in the claims.

What is claimed is:

1. An irrigator for applying a liquid to an area of land, said irrigator comprising:
   a moveable nozzle boom arm adapted to drive a winding means;
   a winding means coupled to said nozzle boom arm;
   a governor connected to said moveable nozzle boom arm and to said winding means;
   wherein the governor includes regulation means having pressure and temperature compensated flow valves and having a limiting means that limits the torque applied to the winding means so that an upper tension limit is not exceeded; and
   wherein, in use, the governor controls the speed of said winding means and the speed and movement of said moveable nozzle boom arm, so that application depth of liquid being applied by the irrigator can be kept substantially constant and the regulation means is adapted to maintain or regulate the speed of the winding means and the speed of the nozzle boom arm at substantially a constant tolerance or within an acceptable tolerance about a set point so that as varying forces are applied to the irrigator the application depths are not significantly altered.

2. An irrigator of claim 1 wherein said governor further comprises regulation means adapted to regulate the speed of said winding means and the speed and of said nozzle boom arm.

3. The irrigator of claim 2 wherein the regulation means comprises pressure and temperature compensated hydraulic flow valves.

4. The irrigator of claim 2 wherein the regulation means has an electronically motorised control valve system to control the impact of environmental and physical conditions when operating the irrigator.

5. The irrigator of claim 2 wherein the regulation means maintains or regulates the speed of the winding means and the speed of the nozzle boom arm at substantially a constant tolerance or within an acceptable tolerance so that as varying forces are applied to the irrigator the application depths are not significantly altered.

6. The irrigator of claim 1 wherein said governor is part of a hydraulic transmission means connecting the nozzle boom arm to a shaft of the winding means.

7. The irrigator of claim 6 wherein the hydraulic transmission means comprises at least one hydraulic valve, at least one hydraulic cylinder, at least one spring, at least one linkage and at least one clutch arranged and connected together so as to control the speed of he winding means and the speed and movement of the moveable nozzle boom arm.

8. The irrigator of claim 1 wherein the speed of the winding means and the speed of the nozzle boom arm are to be regulated at a substantially constant rate.

9. The irrigator of claim 1 wherein the moveable nozzle boom arm rotates when the irrigator is in use.

10. The irrigator of claim 1 wherein the moveable nozzle boom arm oscillates when the irrigator is in use.

11. The irrigator of claim 1 wherein the irrigator is a traveling irrigator.

12. A traveling irrigator for applying a liquid to an area of land, said irrigator comprising:
    a rotating nozzle boom arm;
    a hydraulic transmission means coupled to said rotating nozzle boom arm;
    at least one winding means having a shaft;
    said shaft coupled to said hydraulic transmission means;
    wherein, said winding means winding action is derived from a hydraulic transmission means connecting a shaft of the winding means to said rotating nozzle boom arm; and
    said hydraulic transmission means further having a regulation means having pressure and temperature compensated flow valves and having a limiting means to limit the torque applied to said winding means so that an upper tension limit in a cable which draws the traveling irrigator is not exceeded, said regulation means regulates the speed of the winding means and nozzle boom arm and maintains the speed substantially constant or within an acceptable tolerance about a set point so that as varying forces are applied to the traveling irrigator the speed is not significantly altered and application depth of liquid being applied by the irrigator can be kept substantially constant.

13. A traveling irrigator for applying a liquid to an area of land, said irrigator comprising:
    an oscillating nozzle boom arm;
    a hydraulic transmission means coupled to said rotating nozzle boom arm;
    at least one winding means having a shaft;
    said shaft coupled to said hydraulic transmission means;
    wherein, said winding means winding action is derived from a hydraulic transmission means connecting the shaft of the winding means to said oscillating nozzle boom arm; and
    said hydraulic transmission means further having a regulation means having pressure and temperature compensated flow valves and having a limiting means to limit the torque applied to said winding means so that an upper tension limit in a cable which draws the traveling irrigator is not exceeded, said regulation means regulate the speed of the winding means and nozzle boom arm and maintains the speed substantially constant or within an acceptable tolerance about a set point so that as varying forces are applied to the traveling irrigator the speed is not significantly altered and application depth of liquid being applied by the irrigator can be kept substantially constant.

14. A method of moving an irrigator comprising the step of
    (a) providing an irrigator having a movable nozzle arm boom, a governor, with a regulation means, a winding means, said winding means having a cable coupled to an anchor; and
    (b) transferring the movement of said nozzle boom arm, via a governor, to a winding means so that as the nozzle arm boom moves in a transverse direction when irrigating, the speed of the nozzle arm boom and the speed of the winding means being regulated by regulation means of the governor which enables the winding means to wind up said cable to the pull the irrigator along at a regulated speed along a surface to be irrigated so that the speed is substantially constant or within an acceptable tolerance about a set point so that as varying forces are applied to the traveling irrigator the speed is not significantly altered and application depth of liquid being applied by the irrigator can be kept substantially constant along a surface to be irrigated.

15. A governor, said governor structured to be connected to a movable nozzle boom arm and to a winding means of a traveling irrigator for applying a liquid to an area of land, said winding means having a cable, said governor comprising:

a regulation means;

a limiting means;

wherein said regulation means being adapted to regulate the speed of the winding means and the speed of said nozzle boom arm so that the speed is substantially constant or within an acceptable tolerance about a set point so that as varying forces are applied to the traveling irrigator the speed is not significantly altered and application depth of liquid being applied by the irrigator can be kept substantially constant along a surface to be irrigated; and further wherein the limiting means is adapted to limit the torque applied to said winding means so that an upper tension limit in said cable, which draws said traveling irrigator, is not exceeded.

* * * * *

UNITED STATES PATENT AND TRADEMARK OFFICE
CERTIFICATE OF CORRECTION

PATENT NO. : 6,860,435 B2
DATED : March 1, 2005
INVENTOR(S) : Stuart Dundonald Reid It is certified that error appears in the above-identified patent and that said Letters Patent is hereby corrected as shown below:

<u>Title page,</u>
*Assistant Examiner*, "Thach h. Bui" should read -- Thach H. Bui --.

<u>Column 8,</u>
Line 45, "step" should read -- steps --.
Line 57, remove the first instance of "the".

Signed and Sealed this

Fifth Day of July, 2005

JON W. DUDAS
*Director of the United States Patent and Trademark Office*